April 27, 1926.
G. C. REEVES
WINDSHIELD WEATHERPROOFING
Filed July 20, 1923
1,582,689
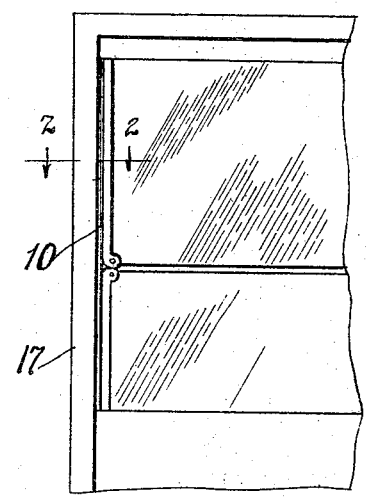
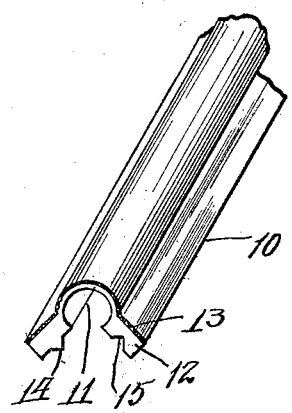
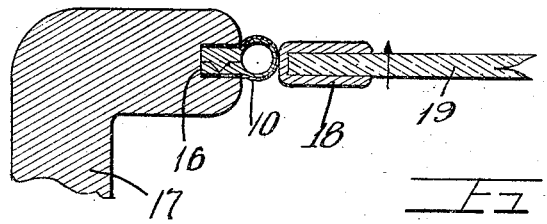
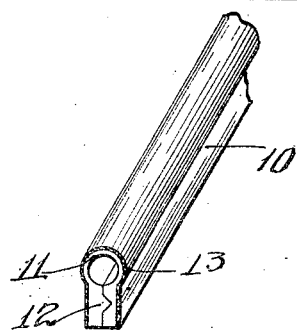

Patented Apr. 27, 1926.

1,582,689

UNITED STATES PATENT OFFICE.

GEORGE C. REEVES, OF CHICAGO, ILLINOIS, ASSIGNOR TO DRYDEN RUBBER COMPANY, OF CHICAGO, ILLINOIS, A CORPORATION OF ILLINOIS.

WINDSHIELD WEATHERPROOFING.

Application filed July 20, 1923. Serial No. 652,762.

*To all whom it may concern:*

Be it known that I, GEORGE C. REEVES, a citizen of the United States, and a resident of the city of Chicago, in the county of Cook and State of Illinois, have invented certain new and useful Improvements in a Windshield Weatherproofing; and I do hereby declare that the following is a full, clear, and exact description of the same, reference being had to the accompanying drawings, and to the numerals of reference marked thereon, which form a part of this specification.

This invention relates to weather strips and, while not restricted to such use, is particularly adapted for automobile windshields.

In order to close the space ordinarily existing between the side edges of the windshield and its supporting frame, it has been suggested to insert a rubber strip in the frame adapted to contact with the edge of the windshield when the latter is in closed position. The contacting portion of the rubber strip was tubular in form so as to yield more readily than a solid strip of material. It has been found, however, by experience that the rubber strip tended to crack along the hinge or flexing point.

Further, the manufacture of a closed tube is a much more difficult operation than the production of a flat strip.

It is an object, therefore, of the present invention to provide an improved form of weather strip.

Another object of the invention is to provide means for preventing rubber weather strips from cracking.

It is also an object of the invention to provide a fabric reinforced weather strip.

An additional object of the invention is to provide a weather strip which is made and shipped substantially flat, and which may be folded to give the desired tubular form.

Other and further important objects of this invention will be apparent from the disclosures in the accompanying drawings and specification.

The invention (in a preferred form) is illustrated in the drawings and hereinafter more fully described.

On the drawings:

Figure 1 is an elevation of one end of an automobile windshield with the improved weather-strip applied thereto.

Figure 2 is a section on the line 2—2 of Figure 1.

Figure 3 is a view of the strip as it is formed.

Figure 4 is a view of the strip with its edges pressed together preparatory to insertion in its groove in the windshield frame.

As shown on the drawings:

The weather-strip 10 comprises a strip of rubber having a thin central portion 11 and thickened edge portions 12. On the outer side of the strip is vulcanized or otherwise secured a fabric reinforcement 13. On one edge is arranged a longitudinal ridge 14 and on the other a longitudinal groove 15 adapted to register and interlock when the edges are brought together as shown in Figures 2 and 4.

After the edges have been pressed together the strip is then inserted in a groove 16 in the side frame 17 of the windshield. The outward spring of the strip tends to hold the strip in position as a whole and the interlocking of the ridge 14 and groove 15 prevents displacement of one edge relatively to the other edge. The outer tubular portion of the strip is then in position to contact with the metal rim 18 of the windshield 19.

The strip may conveniently be made from large sheets of vulcanized rubber and fabric by pressing them together between suitably shaped molds to form not only the edge and center portions of each strip, but also lines of separation along which the large sheet may readily be subdivided into individual strips.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. A weather-strip comprising a strip of rubber, fabric reinforcement secured to one face of said strip, the central portion of the rubber strip being thinner than the edge portions, and a ridge on one edge portion adapted to enter a groove on the other edge portion when the two edges are brought together.

2. A weather-strip comprising a strip of rubber, the central portion of the rubber strip being thinner than the edge portions, and a ridge on one edge portion adapted to enter a groove on the other edge portion when the two edges are brought together to form a tube of the central portion.

3. A weather-strip comprising a strip of rubber having two edge portions and a tube portion adapted to form a tube when the edge portions are brought together, said strip being vulcanized with the edge portions separated thereby imparting an outward spring to the strip when the edge portions are brought together.

In testimony whereof I have hereunto subscribed my name.

GEORGE C. REEVES.